Patented May 10, 1927.

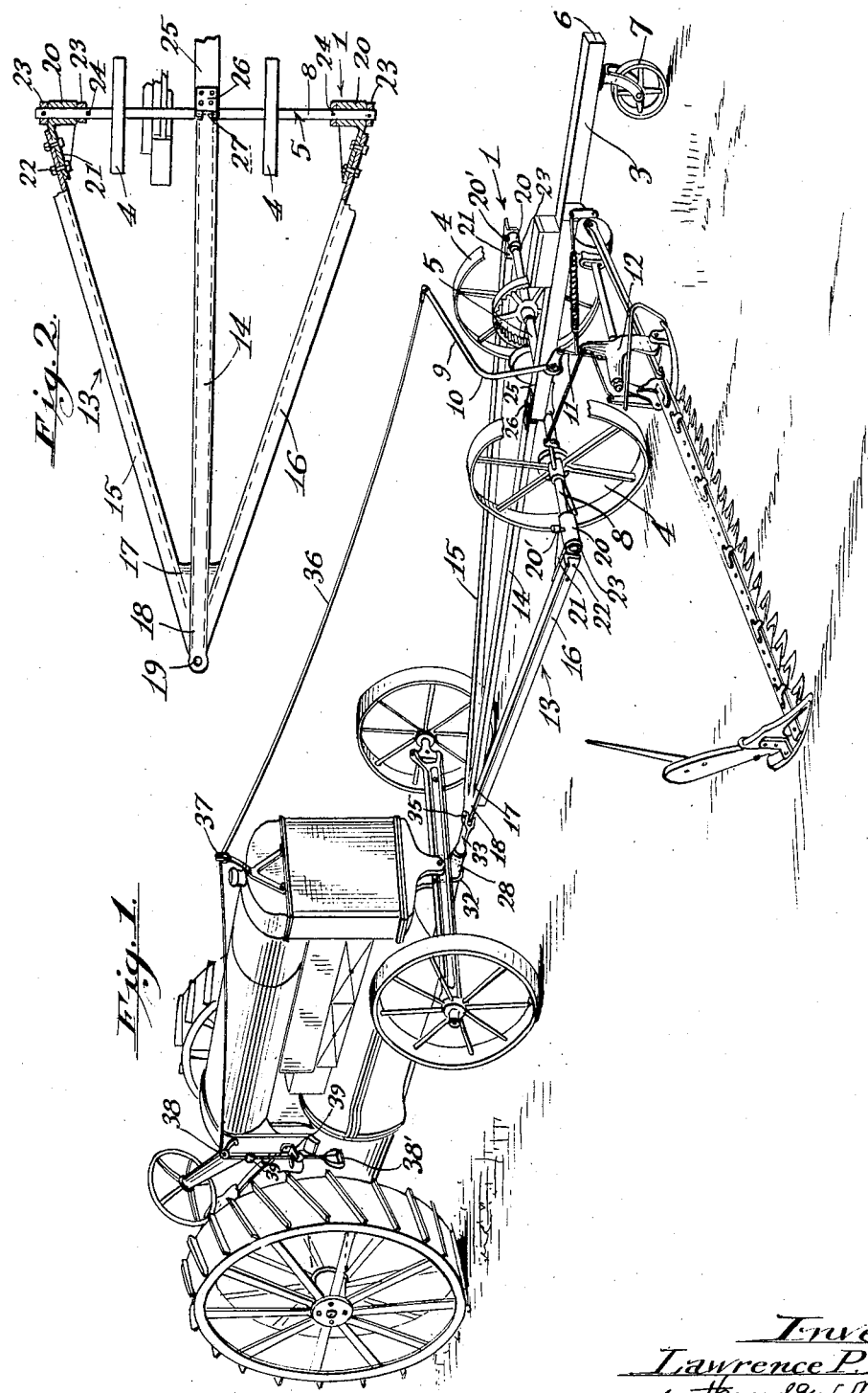

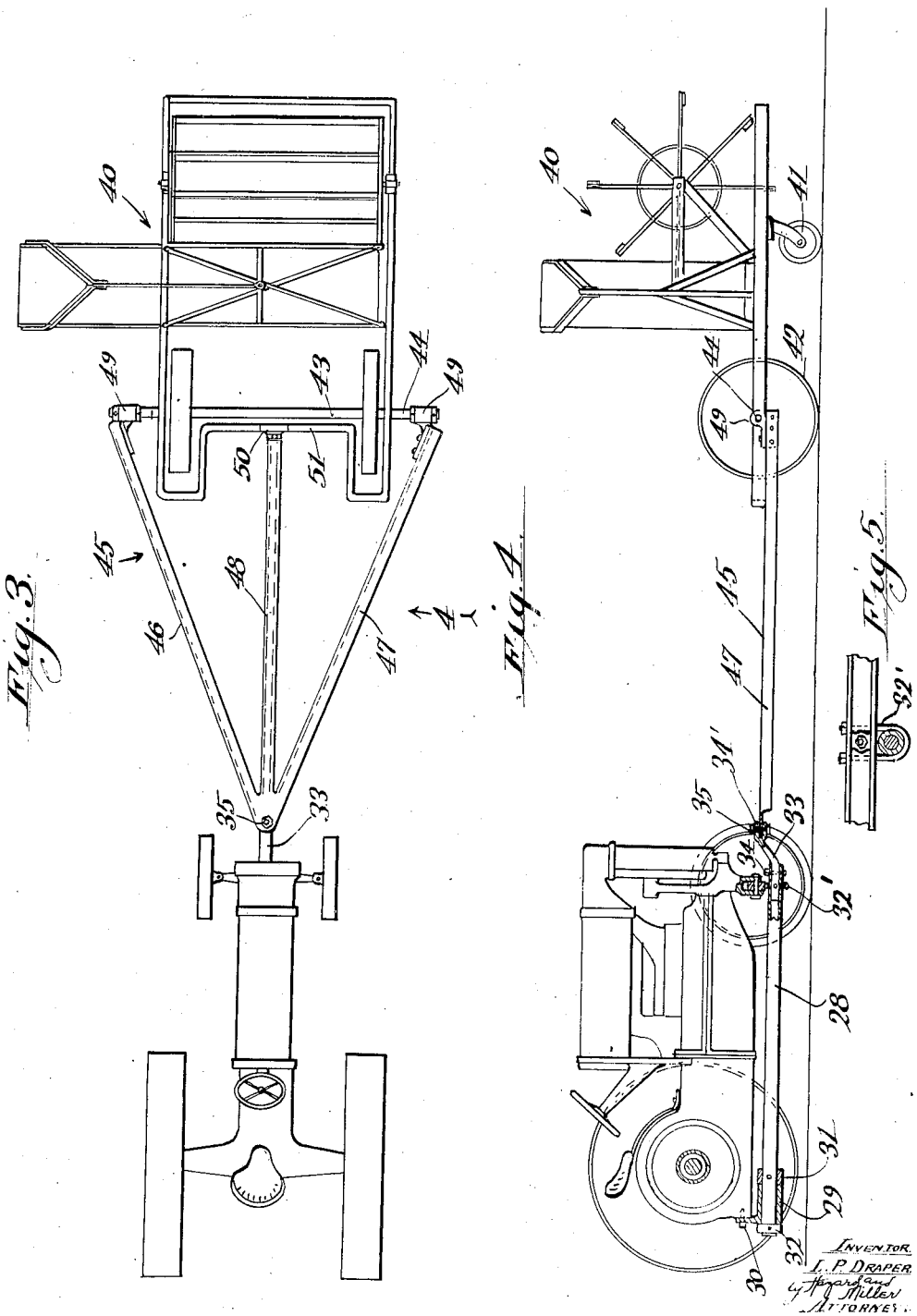

1,628,038

UNITED STATES PATENT OFFICE.

LAWRENCE P. DRAPER, OF MESA, ARIZONA.

TRACTOR PUSH DRIVE FOR MOWING MACHINES, BINDERS, HEADERS, HARVESTERS, OR THE LIKE.

Application filed September 7, 1926. Serial No. 133,856.

My invention is a tractor push drive for mowing machines, binders, headers, harvesters or the like, in which a tractor or similar automotive machine is utilized to push or shove the various implements ahead of same in the various operations to which said implements are employed.

An object of my invention is a construction by which a tractor or other suitable automotive machine is used to push various implements such as agricultural implements over the ground and having a pivotal connection between said implements and the tractor to allow proper steering of same by manipulating the steering of the tractor.

As applied to a mower for cutting hay or the like, a framework having a central pushing bar and diverging pushing bars is connected to the mowing machine, preferably to the axle or as close to the axle as possible. The mowing machine is altered by cutting off the tongue and fastening a caster wheel thereto so that the tongue will be maintained at the proper elevation above the ground. The rear ends of the pusher bars are secured together and by means of a vertical pivot are connected to the tractor.

Another feature of my invention is conveying the thrust by a suitable thrust rod to the draw bar attachment at the rear axle housing. The mower is arranged to be operated by the driver of the tractor by means of a flexible cable connected to the cutter bar lever of the mower which is slightly bent to be more readily operated by a cable than by hand.

My invention in its various aspects will be understood from the following description and drawings, in which;

Figure 1 is a perspective view of a mower with the attachment for pushing same from a tractor;

Fig. 2 is a plan view partly broken away, showing the attachment and its connection to the mower;

Fig. 3 is a plan view of my invention as applied to a grain header or the like, the header being shown on a reduced scale in reference to the tractor;

Fig. 4 is a side elevation taken on the line 4—4 of Fig. 3 in the direction of the arrow;

Fig. 5 is a detail transverse section showing the connection of the thrust rod to the front axle.

Referring first to the construction of Figs. 1 and 2, the mower is designated generally by the numeral 1, having a cutter bar 2, a tongue 3, the wheels 4 and the axle 5, the tongue being connected to the axle in any suitable manner. The ordinary axle of the mower merely extends through the wheels and is secured on the outside of same and the tongue extends a sufficient distance forward for harnessing a team of horses thereto.

In the alteration of the mower to suit my invention a tongue is cut as indicated by the numeral 6 and a caster wheel 7 is secured to the tongue. The ordinary axle is removed and an axle utilized which has extension ends 8 extending the desired distance beyond the wheels. The ordinary sickle bar lifting lever 8 is bent, having an angular bend 10 and this being connected by a link 11 to the inner structure 12 of the mower which is connected to the sickle bar. These latter features are in no way altered and the sickle is operated in the ordinary manner due to the rotation of the mower wheels The particular attachment suitable for a mower is illustrated in Fig. 2 and is designated as the pusher attachment 13. This has a central pusher bar 14 and diverging pusher bars 15 and 16. The center bar is preferably formed of a channel with the web up and the flanges extending downwardly. The diverging pusher bars preferably are formed of angles and these are connected at their converging end by a suitable bracing indicated by the numeral 17 and are rigidly bolted or welded together at the converging end 18 having a vertical pivot aperture 19 therethrough.

Each end of the axle is provided with journal boxes 20 having grease cups 20' and flanges 21 extending along the diverging pusher bars and bolted thereto by bolts 22. Collars 23 are placed on the axle and secured in fixed relation to the journals by cotter pins 24 or the like. The central pusher bar is connected to the rear end 25 of the tongue by a hinge 26 having a horizontal pintle 27.

In assembling the attachment to the mower, as above mentioned the mower is provided with an elongated axle with the extensions 8 beyond the wheels, the wheels being suitably connected to the axle in any desired manner. The journals 20 are secured to the axle in the proper position and the diverging brace arms 15 and 16 bolted to the flanges 21. This gives a suitable rigid structure.

The tractor is provided with a thrust rod 28 preferably formed tubular and passing through a tubular bracket 29 at the rear end. This bracket may be the draw bar attachment or be secured to the rear axle housing by bolts 30 or the like. Clamping collars 31 and 32 at the forward and rearward part of the tubular bracket prevent same from having any longitudinal movement. A yoke 32' formed of a U-shaped bolt or clamp is secured to the front axle of the tractor in any suitable manner or may be secured to the forward underneath portion of the tractor. This does not take any thrust but merely holds the thrust rod in position.

A tongue 33 is preferably inserted in the end of the thrust rod and secured thereto in any suitable manner as by the bolts 34, this tongue having a pair of ears 34' with the pivot pin 35 extending downwardly through the ears and through the aperture 19 of the attachment. This gives a pivotal connection between the tractor and the attachment and mowing machine.

The operating lever of the mower is connected by a flexible cable 36 to the tractor, this passing over guide pulleys 37 and 38. The end of the cable is provided with a stirrup 38', a V-shaped catch device 39 is rigidly attached to the tractor, and an adjustable clamping ball 39' secured to the cable. This ball is adapted to be attached in any desired position and hooks under the catch device 39 when the operator places his foot in the stirrup and presses downwardly and also swinging the foot outwardly so that the ball will engage below the catch. This operation swings the lever 9 rearwardly and elevates the sickle bar in the same manner as if it were manipulated directly by an operator on the mower.

The steering of a mowing machine connected with a tractor by my attachment mechanism is very simple. It will be seen that the attachment is connected to the mower by a pivotal connection which will allow the tractor to pass over uneven ground with the caster wheel dipping and rising relative to the tractor in accordance with the irregularities of the ground. Although the cutting stresses are all on one side of the mower, on account of the long leverage of the attachment pusher bars the tractor maintains the same in proper position and may push the mower forwardly to make a straight cut at substantially any suitable speed desired. When it is desired to turn the mower the tractor steering wheels are first turned in the reverse direction of the turn for the mower and then the tractor is steered to follow the direction desired to give the mower. As the attachment is connected to the tractor by a vertical pivotal connection and the attachment is connected to the mower by a horizontal pivotal connection, the tractor readily pushes the mower into the direction desired and the mower and tractor may pass over uneven ground.

To illustrate other adaptations of my invention the connection of same to a grain header is shown in Figs. 3 and 4. In this case the heading machine is of the ordinary type and is designated by the numeral 40. This is altered by having a caster wheel 41 secured to the underneath part of the structure ahead of the driving wheels 42 and the axle 43 for said wheels has an extension 44 extending beyond the driving wheels. The attachment 45 is provided with pusher bars 46 and 47 forming a V-shaped frame with a central pusher bar 48. The outer bars are attached to suitable journals 49 on the ends of the axle secured substantially the same as shown in connection with Fig. 2. The central bar is connected by means of a horizontal hinge 50 to the frame 51 of the header. The pivot pin 35 extends through an aperture in the rear end of the attachment, the bars 46 and 47 and 48 being rigidly connected at their converging ends and connected to the tractor by means of a pusher tongue or the like 33, this latter being connected to the thrust rod 28 as above described.

In this construction if desired, suitable flexible cables may be utilized to connect the mechanism of the heading machine to the tractor in any desired manner.

From the above description and drawings, it will be apparent that various agricultural and other implements may be arranged to be pushed by a tractor or the like by using my connecting attachment. I find it desirable to have the pushing bars 15 and 16 and 46 and 47 diverging at as great an angle as is convenient, by extending the axle of the vehicle. It is apparent however, that the ends of these bars could be connected to the axle inside of the wheels and also that the center bar 48 may also be connected to other parts of the mechanism to be pushed. It is desirable that the axial line of the pivoting motion of the side and central pusher bars be substantially in the same axial alinement, but I find that the central pusher bar may be pivoted at a slight departure from such axial line.

It will be seen that a characteristic feature of my invention is connecting some type of implement to a tractor by means of a suitable pushing frame, this frame being connected by a vertical pivot pin to the tractor and by a horizontal pivotal connection to the implement which is being pushed.

It is obvious that my invention may be considerably changed in general construction and in specific details to adapt same for different types of implements, either agricultural or not. Such changes would be within the spirit of my invention as set forth in the description, drawings and claims.

Having described my invention, what I claim is:

1. A tractor push drive for implements comprising in combination a pusher attachment, means to pivotally connect same to an implement having supporting wheels, the pivotal connection having horizontal pivots to the implement, and a fixed vertical pivot to the tractor.

2. A tractor push drive for implements, comprising in combination a tractor, an implement having supporting wheels, an attachment connecting the implement and the tractor, said attachment having a plurality of horizontal pivotal connections to the implement, said connections being substantially on the same axis, and a single fixed vertical pivot connecting the attachment to the tractor.

3. A tractor push drive as claimed in claim 2, the tractor having a thrust rod to which the attachment is pivotally connected, said thrust rod being connected to the rear structure of the tractor.

4. A tractor push device for implements, comprising in combination a tractor, an implement having supporting wheels, an attachment having diverging pusher bars, a horizontal hinged connection between the forward end of the pusher bars and the implement, and a single fixed vertical pivotal connection between the rear ends of the pusher bars and the tractor.

5. A tractor push drive for implements as claimed in claim 4, the attachment having a center pusher bar between the diverging pusher bars rigidly connected at its rear end to the diverging pusher bars and having a horizontal hinged connection to the implement.

6. A tractor push drive for implements, comprising in combination a tractor, an implement having supporting wheels, an attachment having diverging pusher bars and a central pusher bar rigidly connected together at their rear end, said pusher bars having horizontal hinges connected to the implement, said hinge connections being substantially in alinement, the rear end of the attachment having a fixed vertical pivotal connection to the tractor.

7. A tractor push drive for implements as claimed in claim 6, the tractor having a thrust rod with its forward end connected to the vertical pivot, means to support the thrust rod at the forward end of the tractor, and means to attach the rear end to the tractor to transmit the thrust to such end.

8. A tractor push drive for implements, comprising in combination an implement having supporting wheels and an axle therefor, a tractor, an attachment means connecting the forward end of the attachment to the axle to allow vertical swinging movement of the attachment, a single fixed vertical pivotal connection of the rear end of the attachment to the tractor.

9. A tractor push drive for implements comprising in combination an implement having supporting wheels, an axle therefor, a tractor, an attachment having diverging bars, the forward end of said bars being connected to the axle to allow vertical swinging movement of the attachment, a thrust rod connected to the rear part of the tractor and supported by the front end of same, and a fixed vertical pivotal connection between the rear end of the attachment and the thrust rod.

10. A tractor push drive for implements as claimed in claim 9, having a center push bar rigidly connected at its rear end and connected to the diverging push bars, and a horizontal hinge connection between the front end of said center bar and the implement.

11. A tractor push drive for implements, comprising in combination an implement having supporting wheels, an axle for the rear pair of said wheels, said axle extending beyond the wheels, a tractor having a thrust rod rigidly connected to the rear end of same and supported at the front end, a pusher attachment having diverging bars rigidly connected together at their rear end, a vertical pivotal connection between said rear end and the thrust rod, journals on the front end of the diverging bars, said journals being fitted on the axle on the outside of the wheels.

12. A tractor push drive as claimed in claim 11, a center push bar for the attachment being rigidly connected to the diverging bars at the rear end, and having a horizontal hinged connection to the implement, said hinged connection being adjacent the axle.

13. A tractor push drive as claimed in claim 11, the implement having an operative mechanism, a lever to raise and lower said mechanism, a flexible connection between said lever and the tractor, a driver's seat on the tractor and means adjacent said seat to operate the flexible means.

14. A tractor push drive for an implement comprising in combination an implement having a pair of rear wheels, an axle therefor, a caster wheel forward of said pair of wheels, a tractor, an attachment, a horizontal connection for the forward end of the attachment to the implement, said connection being adjacent the axle of the wheels, and allowing a vertical swinging motion of the attachment, and a single vertical pivotal connection of the rear end of the attachment to the tractor.

15. A tractor push drive for mowing machines comprising in combination a mowing machine having a pair of rear wheels, an axle therefor, a tongue secured to the axle and extending forward therefrom, a caster wheel secured to the tongue at the forward part, a tractor, an attachment having diverging push bars, the forward ends of same having a horizontal pivotal connection to the implement and the rear end of the attachment having a vertical pivotal connection to the tractor.

16. A tractor push drive as claimed in claim 15, the mower having a sickle bar, means to raise and lower same on the implement, and a flexible connection between said means and the tractor, said means being manually operable from the tractor.

17. A tractor push drive for mowing machines, comprising in combination a mowing machine having a pair of rear wheels with an axle for same, a tongue extending forwardly from the axle, a caster wheel attached to the tongue forward of the axle, a tractor, an attachment having diverging pusher bars, means connecting the forward end of said bars to the axle, the rear end of said bars being rigidly connected together, and a single vertical pivotal connection between the rear end of said bars and the tractor.

18. A pusher attachment for connecting tractors and implements, comprising in combination a pusher bar, means to connect same by a horizontal pivotal connection to the implement at the forward end of the bar, and means to connect the rear end of the bar by a fixed vertical pivotal connection to a tractor.

19. A pusher attachment to connect a tractor and an implement, comprising diverging pusher bars rigidly connected together at their rear end and having a fixed vertical pivot, means to connect same to a tractor at the rear end, and means to form a horizontal pivotal connection at their forward ends to an implement.

20. A pusher attachment as claimed in claim 19, having a center pusher bar rigidly connected at its rear end to the diverging bars, and means forming a horizontal pivotal connection at the forward end to an implement.

In testimony whereof I have signed my name to this specification.

LAWRENCE P. DRAPER.